United States Patent [19]

Holzapfel et al.

[11] 4,085,579

[45] Apr. 25, 1978

[54] METHOD AND APPARATUS FOR IMPROVING EXHAUST GASES OF A GAS TURBINE INSTALLATION

[75] Inventors: Immanuel Holzapfel, Stuttgart; Werner Bruder, Neckarrems, both of Germany

[73] Assignee: Daimler-Benz Aktiengesellschaft, Germany

[21] Appl. No.: 564,918

[22] Filed: Apr. 3, 1975

[30] Foreign Application Priority Data

Apr. 6, 1974 Germany .............................. 2416909

[51] Int. Cl.$^2$ ............................ F02C 7/02; F02C 9/14
[52] U.S. Cl. ................... 60/39.04; 60/39.16 R; 60/39.23; 60/39.27; 60/39.29; 60/DIG. 11; 60/39.65; 60/39.51 R
[58] Field of Search .......... 60/39.23, 39.27, DIG. 11, 60/39.16, 39.29, 39.65, 39.02, 39.03, 39.04, 39.51 R

[56] References Cited

U.S. PATENT DOCUMENTS

| | | | |
|---|---|---|---|
| 3,691,762 | 9/1972 | Ryberg | 60/39.23 X |
| 3,705,492 | 12/1972 | Vickers | 60/DIG. 11 |
| 3,742,702 | 7/1973 | Quinn | 60/39.23 |
| 3,765,171 | 10/1973 | Hagen | 60/39.23 |
| 3,902,316 | 9/1975 | Huellmantel | 60/39.27 X |

FOREIGN PATENT DOCUMENTS 525,550 8/1940 United Kingdom ................ 60/39.23

*Primary Examiner*—Clarence R. Gordon
*Attorney, Agent, or Firm*—Craig & Antonelli

[57] ABSTRACT

A method for operating a gas turbine installation and an apparatus for carrying out the method, particularly for a vehicle gas turbine installation, in which the air is compressed and heated up by utilizing the exhaust gas heat of the gas turbine installation, fuel is combusted under supply of compressed air with an excess of air, the resulting gas is thinned out and cooled off by admixture of compressed heated air, and the produced gas is then permitted to expand for producing an output; a more or less large quantity of non-preheated air is thereby admixed to the preheated primary air prior to the entry into the combustion zone at least within the lower partial load range, preferably as a function of load, in order to control the temperature in the combustion space.

52 Claims, 7 Drawing Figures

METHOD AND APPARATUS FOR IMPROVING EXHAUST GASES OF A GAS TURBINE INSTALLATION

The present invention relates to an operating method for a gas turbine installation, especially for a vehicle gas turbine installation, in which air is compressed and warmed up by the utilization of the exhaust gas heat of the gas turbine installation, fuel is burned or combusted under supply of compressed air (primary air) with an excess of air and the resulting gas is thinned by the admixture of compressed heated air (secondary air) and is cooled off (gas production) and the produced gas is expanded under work output.

It is known that in thermal power engines, a complete combustion and thus a good efficiency and a small proportion of oxidizable exhaust gas components can be achieved by an air excess during the combustion. Both are desirable phenomena as such. It has further been determined that the preheating of the combustion air and of the thinning and cooling air improves the efficiency of the installation and that thus the specific fuel consumption can be reduced thereby. However, very high combustion temperatures result from the air preheating of the combustion air so that the molecular nitrogen and oxygen is dissociated thereby and the two gases react with each other in this condition; the harmful nitrogen oxides result then. These harmful nitrogen oxides must not exceed a predetermined percentage at least in the partial load range of the engine according to the exhaust gas regulation to be expected.

Consequently, the proposal has already been made in the prior art not to preheat the primary air (German Offenlegungsschrift 2,163,822). However, the efficiency of the propulsion unit is worsened thereby, and more particularly, when one is to drive with air excess. Precisely in the partial load range where, on the one hand, the danger of the formation of undesired harmful exhaust gas components is particularly large, the efficiency of the gas turbine installation, on the other hand, is already particularly poor anyhow.

It is the aim of the present invention to indicate a novel approach, as to how the temperature can be held at all driving points within the combustion zone at values, at which nitrogen oxides result at most in nonharmful or permissive quantities, and as how as high as possible an efficiency can be attained nonetheless. According to the present invention, one proceeds for the solution of this task in such a manner that a more or less large amount of non-preheated air is admixed to the preheated primary air, preferably as a function of the load, prior to the entry into the combustion zone at least within the lower partial load range.

Consequently, the temperature of the primary air is influenced according to the present invention by a more or less strong admixing of "cold" air and an influence is exerted on the temperature in the combustion zone by this control of the primary air temperature. By reason of the thorough mixing of preheated air with non-preheated air prior to the entry into the combustion zone, the air serving the combustion has a uniform temperature everywhere and the temperature in the combustion zone can be controlled thereby more reliably than if undesirable warm and cold combustion air were to flow into the combustion zone. This is so as excessively hot combustion zones and areas abnormally deviating downwardly from the customary flame temperature could form in the combustion zone, i.e., a heterogeneous flame could result therefrom. Non-permissively large quantities of nitrogen oxides could form at the hot places whereas at the less hot places, the combustion would proceed with an unsatisfactory efficiency. Altogether, this would produce an unsatisfactory result as regards efficiency and as regards the exhaust gas purity. Thanks to the locally uniform controllable primary air temperature, the flame temperature can be influenced in its overall level and a comparatively homogeneous flame will form therefrom.

A good compromise between flame temperature decrease —i.e., less nitrogen oxide formation—and the aim to permit the combustion to take place at as high a temperature level as possible for reasons of a good efficiency, resides in that at most approximately 15% of the rate of air flow of the gas turbine installation in nonpreheated air is admixed to the preheated primary air.

The load dependency of the admixture of non-preheated air takes place advantageously in such a manner that—starting from the idling output of the turbine installation—a slight amount of non-preheated air is admixed, that this quantity is increased to a maximum value with an increasing output adjustment of the gas turbine installation, whereby this maximum value is attained in the middle partial load range and that with a further increase of the output adjustment beyond the middle partial load range, the quantity of non-preheated admixed air is again decreased up to an admixture quantity of zero, whereby this point is attained still below the output adjustment to the magnitude of the rated output of the gas turbine.

For carrying out the operating method according to the present invention, a correspondingly equipped gas turbine installation is required. The present invention therefore starts with a gas turbine installation, for example, as described in the aforementioned German Offenlegungsschrift 2,163,822, which includes a compressor and at least one combustion chamber supplied with fuel, in which inlet apertures for the supply of socalled primary air are provided in the combustion chamber wall within the area of a combustion zone arranged closest to the fuel supply and in which inlet apertures for the supply of socalled secondary air are provided within the area of a thinning zone arranged behind the combustion zone, and which includes additionally an expansion section connected downstream or behind the combustion chamber or chambers, serving as drive for the compressor and for a separate load of mechanical energy and having at least one turbine wheel, as well as a heat-exchanger which is traversed by the compressed air on the side of the heat absorption and is acted upon by exhaust gases on the side of the heat removal, whose discharge aperture for the heat-absorbing medium is operatively connected with at least a portion of the inlet apertures for the secondary air by way of at least one warm-air channel and whose feed line for the heat-absorbing medium is operatively connected by way of a by-pass line with at least a portion of the inlet apertures for the primary air and having means for influencing the distribution of the volume stream to the by-pass line and to the warm-air channel.

The admixture according to the present invention of non-preheated air takes place in one embodiment of the present invention in that the flow paths for the preheated and non-preheated air combine in a mixing chamber located outside of the combustion zone and in that at least one wall provided with apertures is arranged between the mixing chamber and the combustion zone. The end wall which is frequently provided with sheet metal swirl guide plates or baffles adjacent the apertures and which imparts to the air two different, mutually concentrically disposed flows that are not separate from one another and have mutually oppositely directed swirls, may be considered as a wall favoring the mixing and provided with apertures. This is so as, on the one hand, the mixing is caused by such a wall by reason of the back pressure caused thereby and of the flow equalization effected thereby in the mixing chamber disposed upstream thereof. On the other, a certain mixing of the air can still take place after the discharge out of the mixing chamber up to the entry into the flame front, which if favored by the two mutually oppositely directed swirling or vortexing flows. The mixing chamber, however, may also be in communication with the combustion chamber by way of pipe lines or other flow paths, as long only as it is separated unequivocally from the combustion chamber from a flow point of view and the components of the primary air are mixed by reason of the constructive realization of the flow paths of the primary air from the mixing chamber entry up to the entry into the flame front. Of course, auxiliary means may be arranged in the mixing chamber itself or measures may be taken, which favor a mixing. For example, an apertured intermediate wall constitutes such a measure or auxiliary means.

A good mixing of the air streams with slight resistance of the mixing installation is achieved if the inlet openings or apertures of the flow paths of the preheated air and of the non-preheated air are so directed and/or constructed at the mixing chamber that the two types of air flow into the mixing chamber at least approximately in the same direction or have each at least a flow component of significant amount in coinciding direction. It is also of help to an intensive mixing with a small construction of the mixing installation favorable from a flow point of view, if the discharge apertures or openings out of the mixing chamber are so directed and/or constructed that a flow deflection takes place between the entry of the preheated and/or the entry of the non-preheated air, on the one hand, and the discharge of the mixed air, on the other.

Gas turbine installations as a rule have an air veil or air screen cooling system for the combustion chamber wall. Air is therby blown in through blow-in slots into the combustion chamber wall which are so formed and arranged that the blown-in air flows along in the form of an air veil flowing along the inner wall of the combustion chamber, whereby the flow channels for this cooling air are branched off from the flow channels of the compressed air. The temperature of this air veil or screen contributes to the temperature control of the flame itself only insignificantly, if at all. In contrast thereto, it is sufficient and/or desirable for cooling purposes and for the attainment of an exhaust gas which is as hot as possible yet still tolerable by the output turbine, if the cooling veil is preheated. It is appropriate for these reasons if the branching place of the cooling air is arranged upstream of the combining place of the flow paths for the preheated air and the non-preheated air. It is achieved thereby above all that non-preheated air is utilized in an economic manner exclusively in the combustion zone for influencing the flame temperature.

For purposes of a fine metering both of the non-preheated admixture air as also of the entire primary air, it is of advantage if the means for influencing the distribution of the volume stream to the by-pass line and to the heat-exchanger or the warm air channel consist of one separate throttling device each in each of the two flow paths. This can be constructively realized in a particularly appropriate manner if the two throttling devices are constructed as coaxially arranged rotary slide valves mutually coupled with their movable parts at least indirectly, whereby preferably the two flow paths extend coaxially to one another within the area of the throttling devices. More particularly, this construction is particularly appropriate if, in a space-saving manner, the two rotary slide valves surround concentrically the combustion space which is constructed of circular shape.

Starting with such a construction of the combustion chamber and of the air control means, it is particularly advantageous if the mixing chamber is also arranged concentrically to the combustion chamber and is constructed hollow-ring like. It is thereby possible to arrange the mixing chamber at that end face of the combustion chamber, at which is also arranged the fuel supply and to permit the same to be traversed radially inwardly by the primary air. The concentric arrangement of combustion chamber, mixing chamber, and control devices has the advantage that large opening cross sections are possible with a light and relatively small construction of the throttling devices and of the mixing chamber.

Tests have indicated that it suffices for a sufficiently reliable operation if the two throttle devices are coupled with each other in such a manner that they are moved simultaneously, i.e., the two throttling devices need not be equipped with separate drives. The effect according to the present invention of a small nitrogen oxide development and of a relatively good partial load efficiency is realized if the two throttling devices are coupled at least indirectly with an adjusting drive which changes the throttling devices according to the indication of an operating magnitude unequivocally changing in dependence of the adjusted output of the installation. A control signal analogous to the adjusted output or the compressor end temperature or the compressor pressure or the compressor rotational speed may also be such an operating magnitude.

In order to be able to adjust optimally the action of the control of the air streams according to the present invention or in order to be able to make the same the subject of a fine adjustment which could be superimposed on the coarse control as a function of the output, it is appropriate if the mutual relative position of the active elements of the throttling devices is adjustable. The mutual coupling of the two throttling devices may be so constructed that the opening cross sections of both throttling devices change in the same direction analogously during actuation thereof. The throttling devices are thereby advantageously so constructed that when traversing the entire movement range of the actuating element of the throttling devices in the same direction, the open cross section of both throttling devices — starting from a respective small flow cross section at the beginning of the actuating path — assume a maximum value of the flow cross section in the middle range of the actuating path and return again toward the end of the actuating path to the small flow cross section (cross section/adjusting path-cycles in the same direction). The smaller flow cross section of the throttling device for non-preheated air may thereby have the value zero, and the smaller flow cross section of the throttling device for the preheated air may have a value of about 50% to about 85%, preferably about ⅔ of the maximum value. The cross section/adjusting of the throttling device for the non-preheated air may appropriately be phase-displaced with respect to the cross section/adjusting path-cycle of the throttling device for the preheated air in the direction toward small adjusting paths.

Accordingly, it is an object of the present invention to provide a method and apparatus for operating a gas turbine installation which avoid by simple means the aforementioned shortcomings and drawbacks encountered in the prior art.

Another object of the present invention resides in an operating method and a corresponding gas turbine installation which improve the exhaust gases thereof as regards exhaust contamination without deterioration in the efficiency of the installation, particularly in the partial load range.

A further object of the present invention resides in a method for operating a gas turbine installation and in a gas turbine installation for carrying out such method in which the temperature in the combustion zone can be kept under all driving conditions at values, at which nitrogen oxides are produced at most in non-harmful, permissive quantities yet an efficiency is attained which is as high as possible.

Still a further object of the present invention resides in a method and apparatus of the type described above by means of which the temperature in the combustion zone can be controlled in a reliable and effective manner without producing excessively high and excessively low spots of combustion temperatures within the combustion zones.

Still a further object of the present invention resides in an operating method for operating a gas turbine installation and in a corresponding gas turbine installation in which a homogeneous flame is ensured with satisfactory efficiency.

Another object of the present invention resides in a method for operating a gas turbine installation and in a gas turbine installation for carrying out such method in which a good mixing of the air streams is achieved with a relatively low resistance of the mixing system.

A further object of the present invention resides in a method and apparatus of the type described above which permits a fine metering of the non-preheated as well as of the preheated air while at the same time utilizing a construction of throttling devices and of a mixing chamber which are relatively small and easy to achieve.

These and further objects, features and advantages of the present invention will become more apparent from the following description when taken in connection with the accompanying drawing which shows, for purposes of illustration only, one embodiment in accordance with the present invention, and wherein.

Figure 2A:
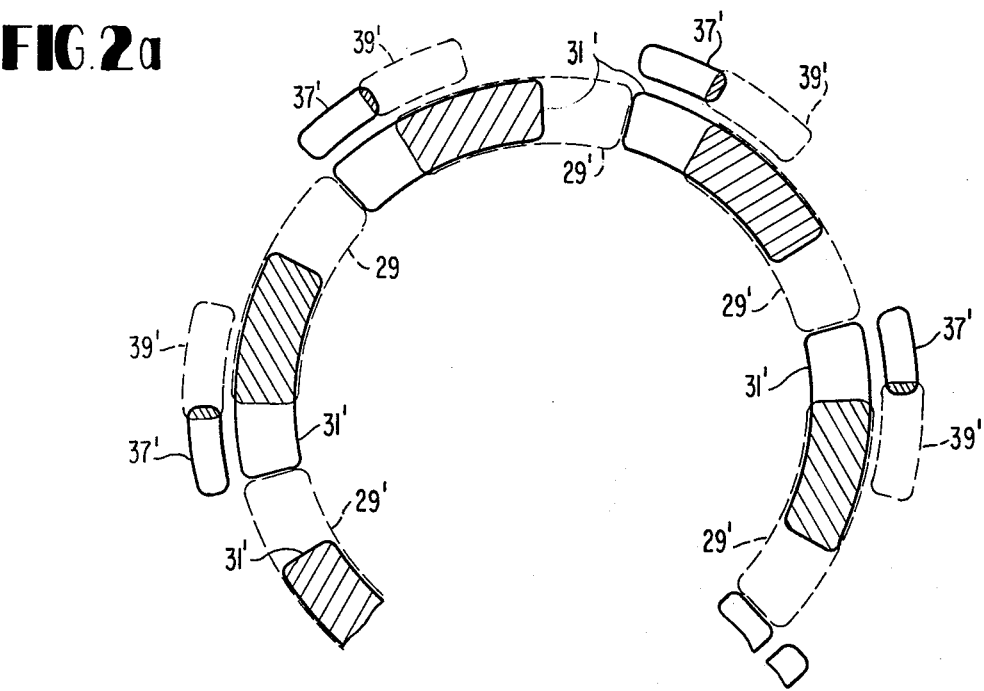
FIGS. 2a – 2c are schematic plan views on three different operating positions of the rotary slide valve pairs at the combustion chamber for the control of the supply of preheated and non-preheated air, and more particularly at low partial load in FIG. 2a, at a middle partial load in FIG. 2b and at the rated point of the gas turbine installation in FIG. 2c.
Figure 2B:
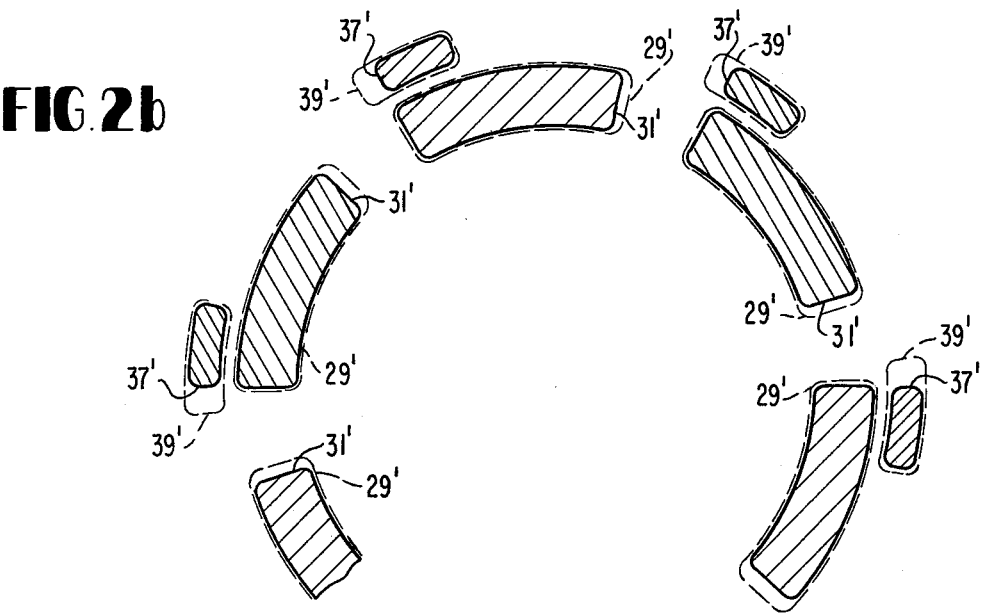
Figure 2C:
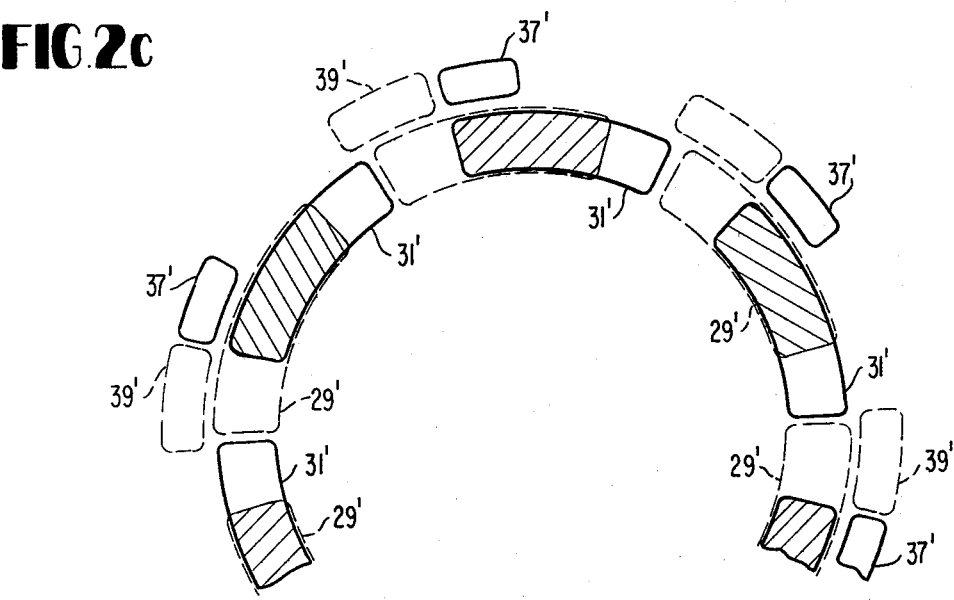
Figure 4B:
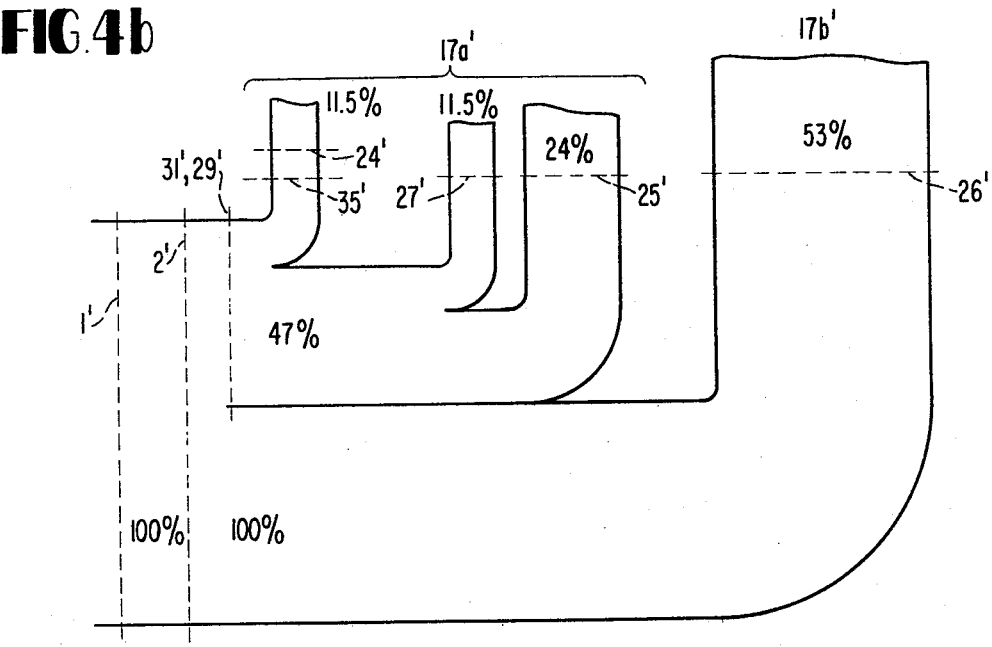
Figure 3:
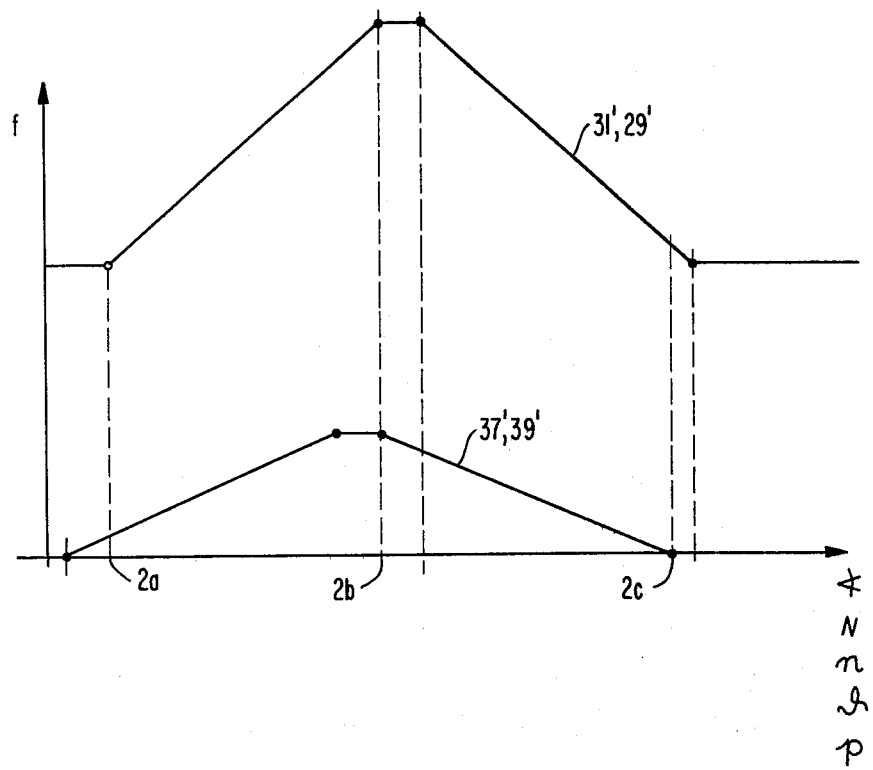
Figure 4A:
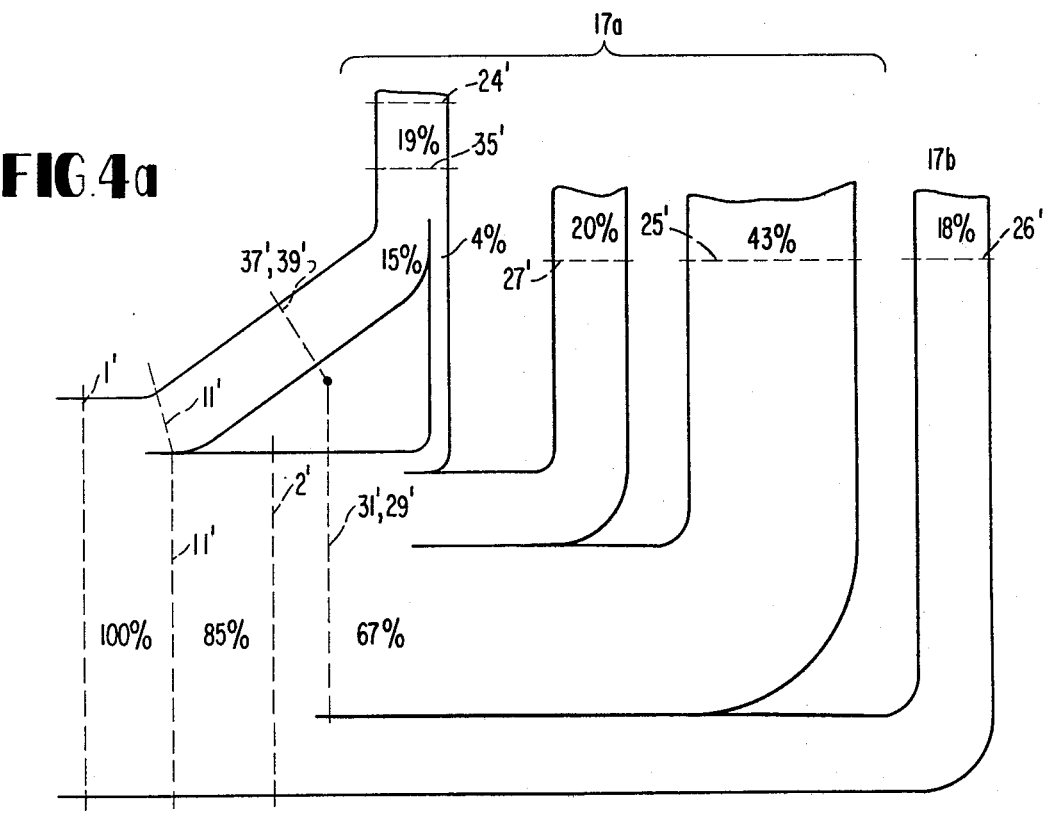

FIG. 3 is a diagram illustrating the two cross section/adjusting-cycles of the rotary slide valve pair; and FIGS. 4a and 4b are schematic illustrations of the distribution of warm- and cold-air to the different places of the combustion chamber requiring air with a fully opened "cold" air supply in FIG. 4a (corresponding to FIG. 2b) and with a completely closed "cold" air supply in FIG. 4b (corresponding to FIG. 2c).

Figure 1:
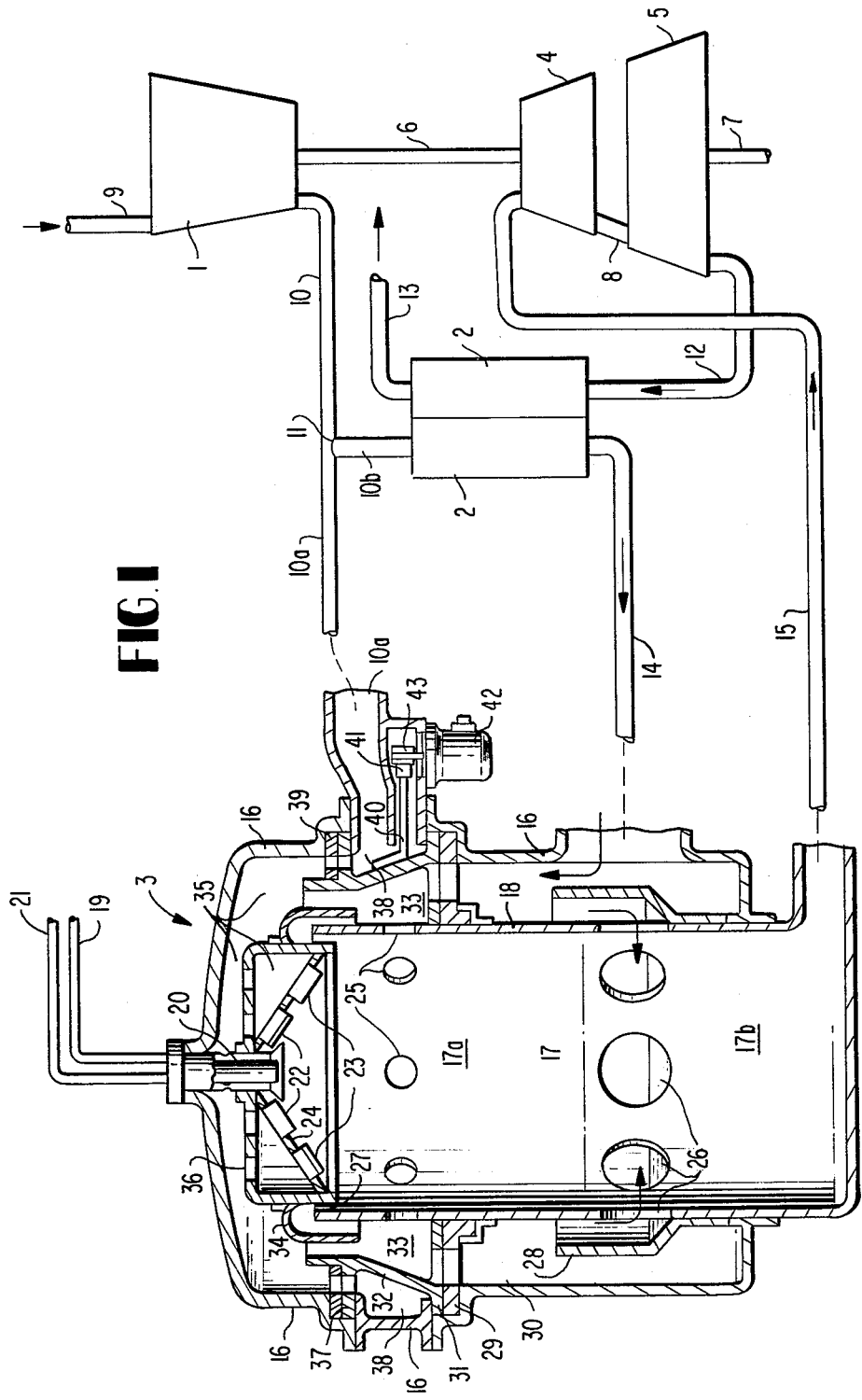
FIG. 1 is a schematic view, partly in cross section, of a gas turbine installation in accordance with the present invention with a combustion chamber illustrated on an enlarged scale.

Referring now to the drawing wherein like reference numerals are used throughout the various views to designate like parts, the gas turbine installation illustrated in FIG. 1 consists of a compressor 1, of a heat-exchanger 2 of a combustion installation generally designated by reference numeral 3, of a compressor turbine 4, with which the compressor 1 is rigidly connected by way of the shaft 6, and of an output turbine 5 as well as of the connecting lines. The illustrated embodiment is a so-called two shaft installation, in which the work or output turbine 5 can rotate independently of the compressor 1. However, the present invention is applicable with equal advantages to a so-called single shaft installation, in which the output shaft transmitting the useful output is arranged directly at the rotor of the compressor and of the compressor turbine. In the two shaft installation, frequently the aggregates, consisting of compressor, heat-exchanger, combustion installation and compressor turbine are combined under the term "gas producer", since the working gas acting upon the output turbine is available only at the discharge or outlet 8 out of the compressor turbine 4. By reason of the high rotational speed range of the output turbine, a reduction gear driven by the output shaft 7 is frequently a fixed component of a gas turbine installation; however, this reduction gear is not illustrated in FIG. 1 for the sake of clarity.

The compressor 1 sucks in air out of the atmosphere by way of the line 9, compresses the same and feeds the compressed air through the line 10. The air heats up to about 200° C. as a result of the compressing action; however, these temperatures can be referred to as "cold" in view of the temperatures otherwise occurring in the installation. A branching place 11 is arranged in the compressor feed line 10, at which the line splits up into the two lines 10a and 10b, with line 10a leading to the combustion installation 3 and supplying the same with non-preheated so-called "cold" air and the line 10b leading to the heat-exchanger 2. The heat-exchanger 2 is of any known type of construction; it may be constructed as rotary storage heat-exchanger (so-called regenerator) or also as recuperator of conventional type. The "cold" compressor-air is the heat-absorbing medium and the gas flowing out the output turbine 5 by way of the exhaust gas line 12 is the medium giving off heat, which after heat removal flows into the atmosphere by way of the exhaust gas line 13. The preheated compressed air is conducted from the heat-exchanger 2 by way of the line 14 to the combustion installation 3. The gases produced by the combustion installation 3 are conducted by way of the output line 15 to the compressor turbine 4 and after a power output thereat, by way of the line 8 to the output turbine 5.

The combustion installation includes an outer casing or jacket 16 and the combustion chamber 17, properly speaking, having the essentially cylindrical combustion chamber wall 18. The intermediate space between the outer casing 16 and the combustion chamber wall 18 serves primarily for the air supply to the individual places of the combustion chamber which require air.

Fuel is supplied to the combustion chamber at the upper end face, as viewed in FIG. 1, by way of the line 19 and the nozzle 20 with the use of atomizing air supplied by way of the line 21. After an initial ignition, the fuel atomized into the combustion space burns or combusts under supply of combustion air which enters essentially by way of the conically shaped combustion chamber end wall 24 provided with through apertures 22 and 23 as well as by way of the apertures 25 in the combustion chamber wall 18. The inlet apertures 22 and 23 in the combustion chamber end wall 24 are arranged along two concentric circles and a baffle surface pointing in the circumferential direction is arranged adjacent each opening or aperture whereby the baffle surfaces of one circle of through-apertures are directed opposite to the baffle surfaces of the other through-apertures. A combustion zone forms in the upper portion 17a of the combustion chamber 17, which depending on the quantity of fuel extends more or less far down into the depth of the combustion chamber (so-called primary zone). Preheated air is admixed in large quantity to the resulting hot gases within the lower adjoining area 17b beginning at the latest at the height of the further inlet apertures 26 in order to cool down the gases to a temperature tolerable for the turbine (so-called secondary-, mixture-or thinning-zone 17b). A sheet metal apron 28 for the better circumferential distribution of the air entering on one side is arranged upstream of the inlet apertures 26. For shielding the hot combustion zone against the combustion chamber wall an air veil or screen flowing along the inner sides of the combustion chamber, is blown in by way of the ring-shaped axially directed slot 27. This air partakes to a certain extent in the combustion.

The intermediate space between the outer jacket 16 of the combustion installation 3 and the combustion chamber wall 18 is subdivided into several annular chambers which serve different purposes: the annular chamber 30 extending between the upper edge of the apron 28 and the apertured plate 29 serves the circumferential distribution of the preheated air masses supplied on one side and to the branching thereof in the upward direction through the apertured plate into the primary zone and in the downward direction into the secondary zone. Above the apertured plate 29 is arranged a rotary slide valve ring 31 and a conical partition wall 32 rising therefrom in the flow direction. An annular chamber 33 is again formed between the rotary slide valve ring 31, the partition wall 32 and the combustion chamber wall 18 which chamber again serves, inter alia, for the purpose of a pressure- and flow equalization and as collecting space for a flow branching or flow distribution. The preheated primary air branches off from the collecting space 33 into three flow directions and more particularly into a radial flow directly into the primary zone through the apertures 25; furthermore, an axial flow branches off from the space 33 through the annular gap between the combustion chamber wall 18 and the deflecting apron 34, also flowing into the combustion space after a 180° deflection, and finally a further axial annular flow flows from the space 33 into the annular shaped mixing chamber 35 disposed above the space 33. The mixing chamber 35 is very disrupted and is even subdivided into two sections by an apertured wall 36. It is separated with respect to the combustion chamber 17 by the conical end wall 24. The air which flows axially into the mixing chamber 35 is deflected within the same through 180° and enters into the combustion space 17 approximately axially, i.e., with a swirl.

A further annular chamber 38 delimited by the outer jacket 16, the conical partition wall 32 of the rotary slide valve and a further rotary slide valve plate 37 is arranged radially outside of the annular chamber 33, which serves the circumferential distribution and collection of the non-preheated air that is radially fed on one side through the line 10a. The cold air is able to pass over also axially into the mixing chamber 35 through the rotary slide valve plate 37 and the apertured plate 39 fixed at the housing.

The two air streams are able to mix intimately in the mixing chamber 35 while flowing therethrough and are thus able to equalize their initially different temperatures. The broken up configuration of the annular chamber, the two-fold directional deflection and the flow through an apertured wall favor this mixing.

Two rotary slide valves 31/29 and 37/39 are arranged in the feed lines for the compressed air to the combustion chamber, with the rotary slide valve 31/29 influencing the supply of preheated air and the rotary slide valve 37/39 influencing the supply of cold air. Both rotary slide valves are constructively combined and their active elements, namely the rotatable apertured plates 31 and 37 are connected with each other by the conically extending partition wall. A toothed ring segment 41 is secured at the partition wall by way of a wheel segment 40 so that the rotary slide valve pair 31/29 and 37/39 can be adjusted with the aid of the adjusting motor 42 and the pinion drive including the pinion 43.

The adjustment of the rotary slide valve pair takes place as a function of load. Elongated apertures in the shape of a circular arc are arranged in the two mutually rotatable apertured plate pairs of the two rotary slide valves, whose length and mutual angular position are accurately matched to one another (see FIG. 2a to FIG. 2c), and which are designated by primed reference numerals otherwise corresponding to the apertured plates. With an output adjustment to greater outputs, the moveable rotatable slide valve members 31 and 37 (FIG. 1) are adjusted in the clockwise direction as viewed in FIGS. 2a to 2c, the movable elongated apertures in the rotary slide valve members being designated in these figures by reference numerals 31' and 37' and are shown in full lines, the fixed elongated apertures which are provided in the stationary members 29 and 39, are designated in these figures by reference numerals 29' and 39' and are in dash lines. Quite predetermined cross section-adjusting path-cycles (31/29)" and 37/39)" result from the predetermined aperture arrangement (FIG. 3). These cross section-adjusting path-cycles are determined according to the cold air admixture required for the desired flame temperature and the corresponding matching of the warm air quantity. It is necessary according to the present invention that at small partial loads, a small proportion of cold air is admixed to the primary air (see FIG. 2a and ordinate (2a) in FIG. 3) and that with an increasing partial load, more and more cold air is admixed to the primary air until approximately 15% cold air is admixed approximately in the middle partial load range (see FIGS. 2b and 4a as well as ordinate (2b) in FIG. 3). The opening cross sections of the warm air rotary slide valve 31/29 and of the cold air rotary slide valve 37/39 are analogously increased in the same direction in this lower partial load range, whereby with increasing output and corresponding increasing fuel quantity to be combusted, an increasing combustion air quantity and an increasing cold air proportion will result. The increasing cold air proportion compensates the effect of a flame temperature rise by reason of the combustion of a larger fuel quantity with the same or approximately the same combustion space (power concentration). Consequently, in the lower partial load range, a cold air quantity which is changeable in dependence on the load but is matched to the changed output concentration, is admixed to the primary air in such a manner that the temperature in the combustion zone does not exceed the temperature, at which nitrogen oxides result in nonpermissively large quantity. This flame temperature influence over the primary air temperature is limited according to the present invention to the minimum necessary so that, on the one hand, the desired effect of exhaust gas purity or the reduction to permissive exhaust gas contaminations is attained but on the other hand, the efficiency is impaired as little as possible.

With a further increase of the power, an increased primary air quantity becomes necessary corresponding to the increased fuel quantity. However, the cold air quantity can now be reduced because a less strongly limited, harmful material emission is permitted within higher output ranges, by the exhaust gas regulations. The legislature has been guided thereby in the consideration that as a rule high power outputs are required from vehicle drives not in cities and dense areas but only on highways in free countryside where higher emissions can cause fewer damages. The opening cross section for the preheated air is nonetheless reduced in the upper partial load range notwithstanding the higher air requirement in order to improve the acceleration behavior.

With the opening reduction at the warm air slide valve 31/29, also the steep pressure increase at the compressor output which will start thereat will be partly compensated with an increase in output so that a controlled air increase will result. In contrast thereto, with the opening reduction at the cold air slide valve, the cold air supply is controlled in a reducing manner within the upper partial load range with an output increase. The slide valve positions and opening cross sections at the adjustment of the output to the rated value of the installation is illustrated in FIG. 2c and represented by the ordinate (2c) in FIG. 3. The air components and their distribution is thereby illustrated in FIG. 4b.

Finally, FIGS. 4a and 4b will be briefly explained. They represent each a flow diagram for the air quantities flowing through the gas turbine installation, whereby the width of the individual flows is proportional to the proportion in the overall rate of air flow and not proportional to absolute quantities of the respective stream. The diagram according to FIG. 4a is valid for maximum cold air admixture of about 15% in the middle partial load range. The individual flow stations or flow cross sections in the gas turbine installation are indicated as transversely extending dash lines and are designated by the corresponding primed reference numeral in reference to the corresponding place in FIG. 1. Consequently, within the middle partial load range, 100% of the air flows through the flow place 1' of the compressor. At the branching place 11 or 11', the air stream branches off by reason of the predetermined already mentioned adjustment of the rotary slide valve pair 39/37 and 31/29 so that 85% of the air quantity flow flows through the heat-exchanger 2 (flow place 2') and 15% flows through the cold air rotary slide valve 37/39. By reason of the pressure conditions prevailing at the individual places of the gas turbine installation within the middle partial load range and by reason of the respective flow resistances of the non-changeable flow paths, 4% of preheated air flows into the mixing chamber 35 (flow place 35') which combines thereat with the 15% of cold air and together enter into the combustion chamber by way of the end face 24 thereof. The air quantities flowing through the warm air slide valve member 31/29 — diagram place (31/29)' — distribute themselves as to the rest with 20% to the cooling air annular gap 27 (flow place 27') and with 43% to the radial inlet apertures 25 (flow place 25'): the air quantities mentioned so far flow into the primary zone 17a (diagram place 17a'). The remaining warm air quantity of 18%, not flowing through the rotary slide valve, flows through the apertures 26 into the secondary zone 17b.

The flow diagram of FIG. 4b looks somewhat different in its layout. Since the cold air slide valve member is completely closed at that time, no air quantities are branched off at the branching place 11 and 100% of the air flow through the heat-exchanger. By reason of the slight opening of the warm air slide valve 31/29, the primary air proportion is smaller (47%) even though — viewed absolutely — it is larger than at partial load. Of this air component supplied to the primary zone 17a, 11.5% are distributed to the end face inlet through the mixing chamber 35 and the wall 24, also 11.5% to the cooling air veil (flow place 27'), and 24% to the radial primary air inlet through the apertures 24. The remaining 53% of the rate of air flow are supplied to the secondary zone 17b by way of the radial inlet apertures 26.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for operating a gas turbine installation which includes a combustion chamber having a combustion zone, and in which air is compressed and heated up by utilizing the exhaust gas heat of the gas turbine installation, fuel is combusted with an air excess under supply of compressed air forming a primary air, and resulting gas of the combusted fuel is thinned out by an admixture of compressed heated air forming a secondary air and is cooled off to produce gases which are expanded while giving off a useful output, the method comprising the steps of:

admixing a more or less large quantity of non-preheated air to the preheated primary air in a mixing chamber disposed outside of the combustion chamber, directing the flow of admixed non-preheated air and preheated primary air into the combustion chamber and combustion zone at least within a lower partial load range, the step of admixing the non-preheated air to the preheated primary air in the mixing chamber takes place as a function of load, and controlling the rate of air flow of the gas turbine installation so that at most approximately 15% of the rate of air flow of the gas turbine installation in non-preheated air is admixed.

2. A method for operating a gas turbine installation which includes a combustion chamber having a combustion zone, and in which air is compressed and heated up by utilizing the exhaust gas heat of the gas turbine installation, fuel is combusted with an air excess under supply of compressed air forming a primary air, and resulting gas of the combusted fuel is thinned out by an admixture of compressed heated air forming a secondary air and is cooled off to produce gases which are expanded while giving off a useful output, the method comprising the steps of:

admixing a more or less large quantity of non-preheated air to the preheated primary air in a mixing chamber disposed outside of the combustion chamber, directing the flow of admixed non-preheated air and preheated primary air into the combustion chamber and combustion zone at least within a lower partial load range, and controlling the rate of air flow of the gas turbine installation so that, starting from the idling output of the gas turbine installation, a slight quantity of non-preheated air is admixed with the slight quantity being increased to a maximum value of approximately 15% of air flow of the gas turbine installation with an increasing output adjustment of the gas turbine installation whereby said maximum value of approximately 15% is reached in a middle partial load range, and in that with a further increase of an output adjustment beyond the middle partial load range, the quantity of non-preheated admixed air is again decreased.

3. A method according to claim 2, characterized in that a decrease in the quantity of non-preheated admixed air beyond the middle partial load range proceeds to an admixture quantity of zero.

4. A method according to claim 3, characterized in that the point of zero admixture is reached at a point below an output adjustment corresponding to a rated output of the gas turbine installation.

5. A method for operating a gas turbine installation which includes a combustion chamber having a combustion zone, and in which air is compressed and heated up by utilizing the exhaust gas heat of the gas turbine installation, fuel is combusted with an air excess under supply of compressed air forming a primary air, and resulting gas of the combusted fuel is thinned out by an admixture of compressed heated air forming a secondary air and is cooled off to produce gases which are expanded while giving off a useful output, the method comprising the steps of:

admixing a more or less large quantity of non-preheated air to the preheated primary air in a mixing chamber disposed outside of the combustion chamber, directing the flow of admixed non-preheated air and preheated primary air into the combustion chamber and combustion zone at least within a lower partial load range, and controlling the rate of air flow of the gas turbine installation so that at most approximately 15% of the rate of air flow of the gas turbine installation in non-preheated air is admixed.

6. A method for operating a gas turbine installation which includes a combustion chamber having a combustion zone, and in which air is compressed and heated up by utilizing the exhaust gas heat of the gas turbine installation, fuel is combusted with an air excess under supply of compressed air forming a primary air, and resulting gas of the combusted fuel is thinned out by an admixture of compressed heated air forming a secondary air and is cooled off to produce gases which are expanded while giving off a useful output, the method comprising the steps of:

admixing a more or less large quantity of non-preheated air to the preheated primary air in a mixing chamber disposed outside of the combustion chamber, directing the flow of admixed non-preheated air and preheated primary air into the combustion chamber and combustion zone at least within a lower partial load range, and controlling the rate of air flow of the gas turbine installation so that, starting from the idling output of the gas turbine installation, a slight quantity of non-preheated air is admixed with the slight quantity being increased to a maximum value with an increasing output adjustment of the gas turbine installation whereby said maximum value is reached in a middle partial load range, and in that with a further increase of an output adjustment beyond the middle partial load range, the quantity of non-preheated admixed air is again decreased.

7. A method according to claim 6, characterized in that a decrease in the quantity of non-preheated admixed air beyond the middle partial load range proceeds to an admixture quantity of zero.

8. A method according to claim 6, characterized in that the point of zero admixture is reached at a point below an output adjustment corresponding to a rated output of the gas turbine installation.

9. A gas turbine installation comprising compressor means for compressing air, heat-exchanger means for heating the compressed air by utilizing the exhaust gas heat of the gas turbine installation, combustion chamber means for combusting fuel with an excess of air under supply of compressed air constituting the primary air, means for thinning resulting gas of the combusted fuel by an admixture of compressed heated air constituting secondary air and cooling the same for producing gases for use in turbine means, and means including said turbine means for expanding the produced gases while producing a mechanical output, characterized in that a mixing chamber means is disposed outside of said combustion chamber means for intimately combining and mixing a more or less large quantity of substantially non-preheated air to the preheated primary air prior to the entry thereof into a combustion zone of the combustion chamber means at least within a lower partial load range, means operable as a function of the load of the gas turbine installation for controlling the amount of non-preheated air so that at most approximately 15% of the rate of air flow of the gas turbine installation is admixed in non-preheated air by said controlling means.

10. An installation according to claim 9, characterized in that said controlling means control the preheated air such that, starting with the idling output of the gas turbine installation, a relatively small amount of non-preheated air is admixed by said controlling means, that said relatively small quantity is increased with an increasing output adjustment of the gas turbine installation to a maximum value whereby this maximum value is reached in a middle partial load range, and that with a further increase of the output adjustment of the gas turbine installation beyond the middle partial load range, the quantity of non-preheated admixed air is again decreased by said controlling means up to an admixture quantity of at least approximately zero.

11. An installation according to claim 10, characterized in that said point of approximately zero admixture is reached at a point below the output adjustment corresponding to a rated output of the gas turbine installation.

12. A gas turbine installation comprising compressor means for compressing air, heat-exchanger means for heating the compressed air by utilizing the exhaust gas heat of the gas turbine installation, combustion chamber means for combusting fuel with an excess of air under supply of compressed air constituting the primary air, means for thinning resulting gas of the combusted fuel by an admixture of compressed heated air constituting secondary air and cooling the same for producing gases for use in turbine means, and means including said turbine means for expanding the produced gases while producing a mechanical output, characterized in that a mixing chamber means is disposed outside of said combustion chamber means for intimately combining and mixing a more or less large quantity of substantially non-preheated air to the preheated primary air prior to the entry thereof into a combustion zone of the combustion chamber means at least within a lower partial load range, and in that means are provided for controlling the amount of non-preheated air in the gas turbine installation so that, starting with the idling output of the gas turbine installation, a relatively small amount of non-preheated air is admixed by said controlling means, that said relatively small quantity is increased with an increasing output adjustment of the gas turbine installation to a maximum value whereby this maximum value is reached in a middle partial load range, and that with a further increase of the output adjustment of the gas turbine installation beyond the middle partial load range, the quantity of non-preheated admixed air is again decreased by said controlling means up to an admixture quantity of at least approximately zero.

13. An installation according to claim 12, characterized in that said point of approximately zero admixture is reached at a point below the output adjustment corresponding to a rated output of the gas turbine installation.

14. A gas turbine installation which comprises a compressor means, at least one combustion chamber means having combustion chamber wall means and supplied with fuel, inlet aperture means for the supply of unheated primary air provided in the combustion chamber wall means within the area of a combustion zone arranged near the fuel supply and inlet aperture means for the supply of heated secondary air provided in the combustion chamber wall means within the area of a thinning zone arranged after the combustion zone, expansion means with at least one turbine wheel means connected downstream of the combustion chamber means and serving the drive of the compressor means and of a separate load of mechanical energy, heat-exchanger means traversed on the heat-absorbing side by the compressed air and acted upon by exhaust gases on the side giving off heat, said heat-exchanger means having outlet means for a heat-absorbing medium in communication with at least a portion of the inlet aperture means for the secondary air by way of at least one warm-air channel means, a feed line for the heat-absorbing medium of said heat-exchanger means in communication with at least a portion of the inlet aperture means for the primary air by way of a by-pass line, and control means for influencing the distribution of the flow to the by-pass line and the warm-air channel means, characterized in that a mixing chamber means is located outside of the combustion chamber means for intimately combining and mixing flow paths of the preheated and non-preheated air prior to entry in the combustion chamber means, at least one wall means is arranged between the mixing chamber means and the combustion zone of the combustion chamber means, and in that aperture means are provided in the at least one wall means for directing the flow of the combined and mixed preheated and non-preheated air from the mixing chamber means into the combustion chamber means.

15. A gas turbine installation according to claim 14, characterized in that the control means is operable in dependence on a load of the gas turbine installation.

16. A gas turbine installation according to claim 15, characterized in that discharge openings are provided for the flow paths of the preheated and non-preheated air at the mixing chamber means, said discharge openings being constructed so that there are two types of air flow into the mixing chamber means with each flow having at least one flow component of significant amount in substantially the same direction.

17. A gas turbine installation according to claim 15, characterized in that the discharge openings of the flow paths of the preheated and of the non-preheated air at the mixing chamber means are constructed so that the two types of air flow into the mixing chamber means at least approximately in the same direction.

18. A gas turbine installation according to claim 16, characterized in that the aperture means in the at least one wall means are discharge apertures constructed so that a flow deflection takes place between an entry of at least one of the non-preheated and preheated air and an outlet of the mixed air.

19. A gas turbine installation according to claim 16, characterized in that the aperture means in the at least one wall means are discharge apertures directed and constructed so that a flow deflection takes place between an inlet of the preheated air and an inlet of the non-preheated air and the discharge of the mixed air.

20. A gas turbine installation according to claim 18, with slot means for blowing air into the combustion chamber means, said slot means are so arranged and constructed that blown-in air flows along as cooling air in the form of an air veil flowing along an inner wall of the combustion chamber means, and flow channels for the cooling air branch off from flow channels of the compressed air, characterized in that a branching place of the cooling air is arranged upstream of a combining place of the flow paths for the preheated and non-preheated air, as viewed in the flow direction.

21. A gas turbine installation according to claim 20, characterized in that the control means for influencing the distribution of the air into the by-pass line and the warm air channel means includes one separate throttling means in each of the two flow paths.

22. A gas turbine installation which comprises a compressor means, at least one combustion chamber means having a combustion wall means and supplied with fuel, inlet aperture means for the supply of primary air provided in the combustion chamber wall means within the area of a combustion zone arranged near the fuel supply and inlet aperture means for the supply of secondary air provided in the combustion chamber wall means within the area of a thinning zone arranged after the combustion zone, expansion means with at least one turbine wheel means connected downstream of the combustion chamber means and serving the drive of the compressor means and of a separate load of mechanical energy, heat-exchanger means traversed on the heat-absorbing side by the compressed air and acted upon by exhaust gases on the side giving off heat, said heat-exchanger means having outlet means for a heat-absorbing medium in communication with at least a portion of the inlet aperture means for the secondary air by way of at least one warm air channel means, a feed line for the heat-absorbing medium of said heat-exchanger means in communication with at least a portion of the inlet aperture means for the primary air by way of a by-pass line means, and control means operable in dependence upon a load of the gas turbine installation influences the distribution of the flow to the by-pass line and the warm air channel means, characterized in that flow paths for a preheated and non-preheated air combine in a mixing chamber means located outside of the combustion zone, at least one wall means provided with aperture means is arranged between the mixing chamber means and the combustion zone, discharge openings are provided for the flow paths of the preheated and non-preheated air at the mixing chamber means, said discharge openings being constructed so that there are two types of air flow into the mixing chamber means with each flow having at least one flow component of significant amount in substantially the same direction, the aperture means in the at least one wall means are discharge apertures constructed so that a flow deflection takes place between an entry of at least one of the non-preheated and preheated air and an outlet of the mixed air, slot means are provided for blowing air into the combustion chamber means, said slot means are so arranged and constructed that blown-in air flows along as cooling air in the form of an air veil flowing along an inner wall of the combustion chamber means, and flow channels for the cooling air branch off from flow channels of the compressed air, a branching place of the cooling air is arranged upstream of a combining place of the flow paths for the preheated and non-preheated air, as viewed in the flow direction, the control means for influencing the distribution of the flow into the by-pass line means and the warm air channel means includes one separate throttling means in each of the two flow paths, both throttling means are constructed as rotary slide valves having movable parts, and in that means are provided for at least indirectly coupling the throttling means with one another.

23. A gas turbine installation according to claim 22, characterized in that the rotary slide valve means are arranged coaxially to each other.

24. A gas turbine installation according to claim 23, characterized in that the two flow paths within the area of the throttling means extend coaxially to one another.

25. A gas turbine installation according to claim 24, with at least one pair of rotary slide valve means, characterized in that the combustion chamber means are of circular construction and that the rotary slide valve pair surrounds concentrically the combustion chamber means.

26. A gas turbine installation according to claim 25, characterized in that the mixing chamber means is constructed of a hollow annular shape and is arranged concentrically to the combustion chamber means.

27. An installation according to claim 26, characterized in that the mixing chamber means is arranged at an end face of the combustion chamber means at which is arranged the fuel supply and which is traversed by the primary air radially inwardly.

28. A gas turbine installation according to claim 27, characterized in that means are provided for mutually coupling the two throttling means in such a manner that the two throttling means are moved simultaneously.

29. A gas turbine installation according to claim 27, characterized in that an adjusting drive means is provided for at least indirectly connecting the two throttling means said adjusting drive means adjusting the throttling means in accordance with an operating magnitude which changes unequivocally in dependence upon an adjusted output of the installation.

30. A gas turbine installation according to claim 28, characterized in that the throttling means include active elements, and in that means are provided for changing a mutual relative position of the active elements.

31. A gas turbine installation according to claim 28, characterized in that a mutual coupling means is provided for coupling the two throttling means to each other, said coupling means is so constructed that opening cross sections of the two throttling means change analogously in the same direction during actuation thereof.

32. A gas turbine installation according to claim 31, characterized in that the throttling means are so constructed that when traversing in the same direction through an entire movement range of an actuating element of the throttling means, the open cross section of both throttling means, starting with a respective small flow cross section at the beginning of the actuating path, assume a maximum value of the flow cross section in a middle area of the actuating path and toward the end of the actuating path, return again to a small flow cross section.

33. A gas turbine installation according to claim 32, characterized in that the small flow cross section of the throttling means for the non-preheated air reaches the value of about zero and that the small flow cross section of the throttling means for preheated air has a value of about 50% to about 85%.

34. A gas turbine installation according to claim 33, characterized in that the slight flow cross section of the throttling means for the preheated air has a value of about ⅔ of the maximum value.

35. A gas turbine installation according to claim 33, characterized in that a cross section/adjusting path-cycle of the throttling means for non-preheated air is slightly phase-displaced with respect to a cross section-/adjusting path-cycle of the throttling means for preheated air in a direction toward small adjusting paths.

36. A gas turbine installation according to claim 14, characterized in that the aperture means in the at least one wall means are discharge apertures constructed so that a flow deflection takes place between an entry of at least one of the non-preheated and preheated air and an outlet of the mixed air.

37. A gas turbine installation according to claim 14, with slot means for blowing air into the combustion chamber means, said slot means are so arranged and constructed that blown-in air flows along as cooling air in the form of an air veil flowing along an inner wall of the combustion chamber means, and flow channels for the cooling air branch off from flow channels of the compressed air, characterized in that a branching place of the cooling air is arranged upstream of a combining place of the flow paths for the preheated and non-preheated air, as viewed in the flow direction.

38. A gas turbine installation according to claim 14, characterized in that the control means for influencing the distribution of the air into the by-pass line and the warm air channel means includes one separate throttling means in each of the two flow paths.

39. A gas turbine installation which comprises a compressor means, at least one combustion chamber means having a combustion wall means and supplied with fuel, inlet aperture means for the supply of primary air provided in the combustion chamber wall means within the area of a combustion zone arranged near the fuel supply and inlet aperture means for the supply of secondary air provided in the combustion chamber wall means within the area of a thinning zone arranged after the combustion zone, expansion means with at least one turbine wheel means connected downstream of the combustion chamber means and serving the drive of the compressor means and of a separate load of mechanical energy, heat-exchanger means traversed on the heat-absorbing side by the compressed air and acted upon by exhaust gases on the side giving off heat, said heat-exchanger means having outlet means for a heat-absorbing medium in communication with at least a portion of the inlet aperture means for the secondary air by way of at least one warm air channel means, a feed line for the heat-absorbing medium of said heat-exchanger means in communication with at least a portion of the inlet aperture means for the primary air by way of a by-pass line means, and control means operable in dependence upon a load of the gas turbine installation influences the distribution of the flow to the by-pass line and the warm air channel means, characterized in that flow paths for a preheated and non-preheated air combine in a mixing chamber means located outside of the combustion zone, at least one wall means provided with aperture means is arranged between the mixing chamber means and the combustion zone, discharge openings are provided for the flow paths of the preheated and non-preheated air at the mixing chamber means, said discharge openings being constructed so that there are two types of air flow into the mixing chamber means with each flow having at least one flow component of significant amount in substantially the same direction, the aperture means in the at least one wall means are discharge apertures constructed so that a flow deflection takes place between an entry of at least one of the non-preheated and preheated air and an outlet of the mixed air, slot means are provided for blowing air into the combustion chamber means, said slot means are so arranged and constructed that blown-in air flows along as cooling air in the form of an air veil flowing along an inner wall of the combustion chamber means, and flow channels for the cooling air branch off from flow channels of the compressed air, a branching place of the cooling air is arranged upstream of a combining place of the flow paths for the preheated and non-preheated air, as viewed in the flow direction, the control means for influencing the distribution of the flow into the by-pass line and the warm air channel means includes one separate throttling means in each of the two flow paths, both throttling means are constructed as rotary slide valves having movable parts, and in that means are provided for at least indirectly coupling the throttling means with one another.

40. A gas turbine installation according to claim 39, characterized in that the rotary slide valve means are arranged coaxially to each other.

41. A gas turbine installation according to claim 39, characterized in that the two flow paths within the area of the throttling means extend coaxially to one another.

42. A gas turbine installation according to claim 39, with at least one pair of rotary slide valve means, characterized in that the combustion chamber means are of circular construction and that the rotary slide valve pair surrounds concentrically the combustion chamber means.

43. A gas turbine installation according to claim 42, characterized in that the mixing chamber means is constructed of a hollow annular shape and is arranged concentrically to the combustion chamber means.

44. A gas turbine installation according to claim 43, characterized in that the mixing chamber means is arranged at an end face of the combustion chamber means at which is arranged the fuel supply and which is traversed by the primary air radially inwardly.

45. A gas turbine installation according to claim 38, characterized in that means are provided for mutually coupling the two throttling means in such a manner that the two throttling means are moved simultaneously.

46. A gas turbine installation according to claim 45, characterized in that the throttling means includes active elements, and in that means are provided for changing a mutual relative position of the active elements.

47. A gas turbine installation according to claim 45, characterized in that a mutual coupling means is provided for coupling the two throttling means to each other, said coupling means is so constructed that opening cross sections of the two throttling means change analogously in the same direction during actuation thereof.

48. A gas turbine installation according to claim 38, characterized in that an adjusting drive means is provided for at least indirectly connecting the two throttling means said adjusting drive means adjusting the throttling means in accordance with an operating magnitude which changes unequivocally in dependence upon an adjusted output of the installation.

49. A gas turbine installation according to claim 38, characterized in that the throttling means are so constructed that when traversing in the same direction through an entire movement range of an actuating element of the throttling means, the open cross section of both throttling means, starting with a respective small flow cross section at the beginning of the actuating path, assume a maximum value of the flow cross section in the middle area of the actuating path and toward a end of the actuating path, return again to a small flow cross section.

50. A gas turbine installation according to claim 49, characterized in that the small flow cross section of the throttling means for the non-preheated air reaches the value of about zero and that the small flow cross section of the throttling means for preheated air has a value of about 50 to about 85%.

51. A gas turbine installation according to claim 50, characterized in that the slight flow cross section of the throttling means for the preheated air has a value of about ⅔ of the maximum value.

52. A gas turbine installation according to claim 49, characterized in that a cross section/adjusting path-cycle of the throttling means for non-preheated air is slightly phase-displaced with respect to a cross section/adjusting path-cycle of the throttling means for preheated air in a direction toward small adjusting paths.

* * * * *